United States Patent
Blanchard et al.

(10) Patent No.: US 7,168,253 B1
(45) Date of Patent: Jan. 30, 2007

(54) MONOBLOC FLAMEHOLDER ARM FOR AN AFTERBURNER DEVICE OF A BYPASS TURBOJET

(75) Inventors: Stephane Blanchard, Chartrettes (FR); Stephane Touchaud, Paris (FR); Thierry Pancou, Saintry sur Seine (FR); Eric Conete, Merignac (FR); Pierre Camy, Saint Medard en Jalles (FR); Georges Habarou, Le Bouscat (FR)

(73) Assignee: Snecma Moteurs, Paris (FR)

( * ) Notice: Subject to any disclaimer, the term of this patent is extended or adjusted under 35 U.S.C. 154(b) by 156 days.

(21) Appl. No.: 11/024,732

(22) Filed: Dec. 30, 2004

(30) Foreign Application Priority Data

Jan. 23, 2004 (FR) .................................. 04 00651

(51) Int. Cl.
*F02K 3/10* (2006.01)
(52) U.S. Cl. .............................. 60/765; 60/766; 60/796
(58) Field of Classification Search .................. 60/761, 60/763, 765, 766, 749, 796
See application file for complete search history.

(56) References Cited

U.S. PATENT DOCUMENTS

| 5,022,805 A | 6/1991 | Roberts |
| 5,090,198 A | 2/1992 | Nightingale et al. |
| 5,103,638 A | 4/1992 | Roberts et al. |
| 5,359,849 A * | 11/1994 | Auffret et al. ................. 60/765 |
| 5,367,873 A | 11/1994 | Barcza et al. |
| 5,497,616 A * | 3/1996 | Roberts ....................... 60/765 |

FOREIGN PATENT DOCUMENTS

| FR | 2 587 455 | 3/1987 |
| FR | 2 687 734 | 8/1993 |
| FR | 2 699 226 | 6/1994 |
| FR | 2 699 227 | 6/1994 |

\* cited by examiner

*Primary Examiner*—L. J. Casaregola
(74) *Attorney, Agent, or Firm*—Oblon, Spivak, McClelland, Maier & Neustadt, P.C.

(57) ABSTRACT

A support arm (13) is intended to be installed in a radial position in an afterburner device of a bypass turbojet. The device comprises first and second inner annular casings defining a passage for a primary flow and an outer annular casing defining together with the first inner annular casing a passage for a secondary flow. The arm (13) comprises a monobloc structure made of composite material including two integral walls (14, 15), on the one hand, designed to define a groove (16) having a substantially V-shaped profile and, on the other hand, including first end parts (17) joined together and adapted to define a foot (18) and second end parts (19) adapted each to define at least one flange (20, 21) intended to be positively connected to the outer annular casing.

19 Claims, 4 Drawing Sheets

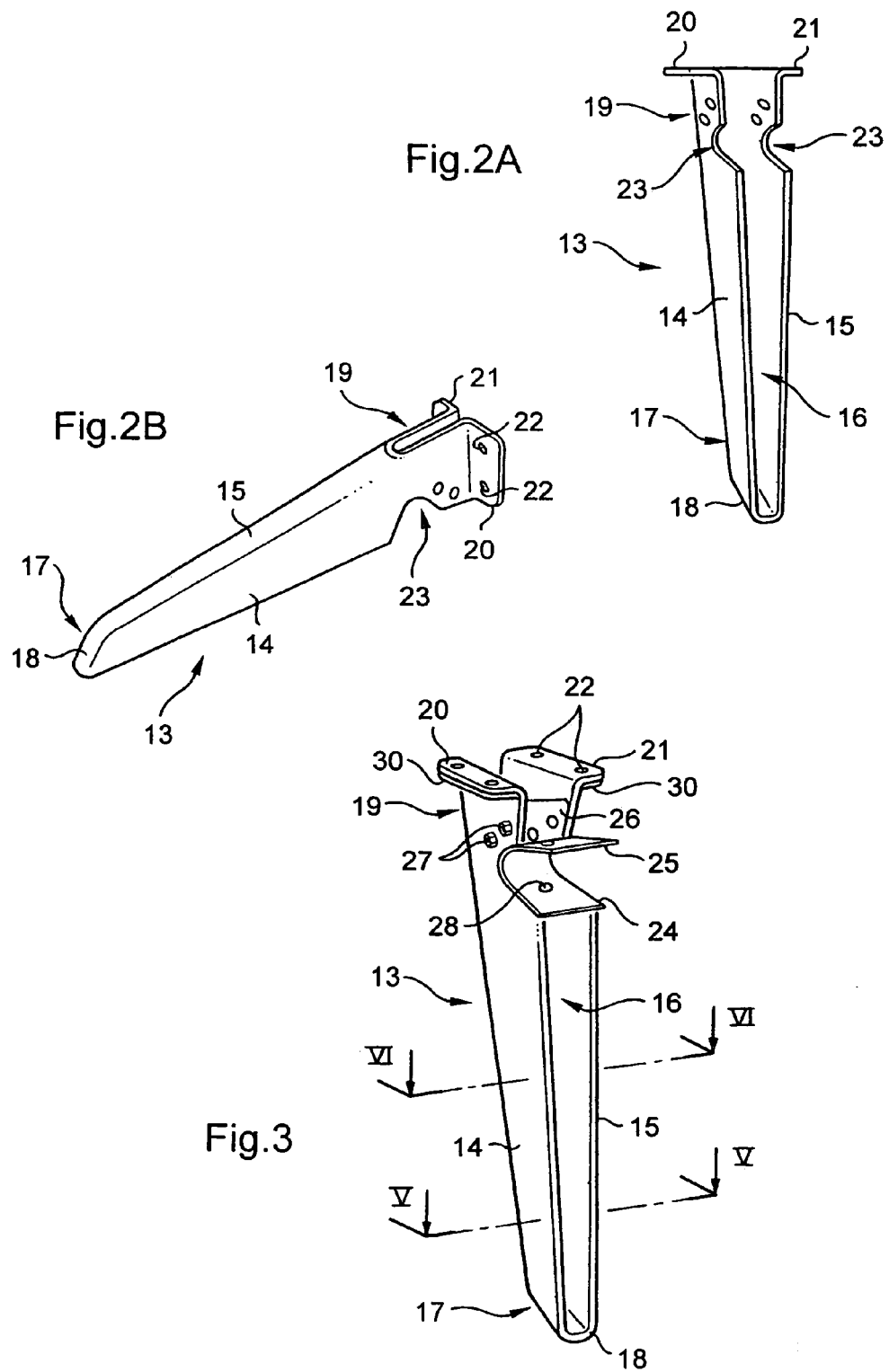

MONOBLOC FLAMEHOLDER ARM FOR AN AFTERBURNER DEVICE OF A BYPASS TURBOJET

The invention relates to the field of bypass turbojets and, more particularly, the afterburner devices provided in turbojet engines of this kind.

In a bypass turbojet of the type shown in FIG. 1, the air flow drawn in by a fan 1 supplies a low-pressure compressor 2. A first part of the compressed-air flow supplies a high-pressure compressor 3, while a second (complementary) part is intended to supply a first passage 4 further downstream defined between an outer annular casing 5 and a first inner annular casing 6 (usually referred to as a flow separator and serving to separate the primary flow from the secondary flow before they are mixed together) of an afterburner device 7. The compressed-air flow through the high-pressure compressor 3 supplies a combustion chamber 8 which supplies exhaust gas to a turbine 9 comprising a high-pressure stage followed by a low-pressure stage and the outlet of which supplies a second passage 10 defined between the first inner annular casing 6 (or flow separator) and a second inner annular casing 11 (usually referred to as an exhaust cone) of the afterburner device 7.

The exhaust gases supplying the second passage 10 are at an elevated temperature and form what is usually referred to as a primary flow (or hot flow). The air supplying the first passage 4 is at a substantially lower temperature than that of the primary flow and forms what is usually referred to as a secondary flow (or bypass flow).

The afterburner device 7 allows a second combustion operation to be carried out by virtue of the injection of fuel into the primary and secondary flows. Part of this injection operation is effected with the aid of a burner ring 12 placed in the vicinity of the first inner casing 6 (or flow separator) in the passage for the secondary flow or for the primary flow. More precisely, the burner ring 12 allows part of the fuel to be injected in a homogeneous manner and the flame to be stabilised.

According to the embodiment selected, the burner ring 12 is carried by support arms 13, also referred to as "flameholder arms", positively connected to the outer casing by means of a support element and/or to the first inner casing by means of fixing means.

The positive connection of the arms to the outer casing by means of a support element is described, in particular, in the document FR 2 699 226. As the support element and the associated arm are positively connected together in a region traversed by the primary flow, the components ensuring this positive connection are therefore subjected not only to considerable thermal stresses, but also to stresses referred to as "airflow pressure". Each arm moreover forms together with a burner ring portion a monobloc sub-structure which is particularly difficult to produce as a result, in particular, of the presence of several rounded edges.

The positive connection of the arms to the first inner casing by means of fixing means is described, in particular, in the documents U.S. Pat. No. 5,103,638, GB 2 295 214, U.S. Pat. No. 5,022,805 and U.S. Pat. No. 5,090,198. In each of these documents, the arms made of composite material are supposed to be positively connected to a metal inner casing placed at the interface between the primary and secondary flows. This results in a difference in thermal expansion between the arms and the casing, compensated for by the use of complex fixing means and interface components.

It is also proposed in the document FR 2 699 227 to form a monobloc structure consisting of the outer and inner casings, the burner ring and the arms. However, a structure of this kind is difficult to produce, particularly as a result of the fact that different materials have to be used for the "cold" components and the "hot" components. Maintenance operations are moreover difficult as a result of the monobloc nature of this structure and damage to one of its components will necessitate the complete replacement thereof.

The aim of the invention is therefore to improve the situation.

To this end, it proposes a support (flameholder) arm for an afterburner device comprising, as indicated in the introductory part, first and second inner annular casings defining a passage for the primary flow and an outer annular casing defining together with the first inner annular casing a passage for the secondary flow.

This arm is characterised in that it comprises a monobloc structure made of composite material including two integral walls, on the one hand, designed to define a groove having a substantially V-shaped profile and, on the other hand, including first end parts joined together and adapted to define a foot and second end parts adapted each to define at least one flange intended to be positively connected to the outer casing.

The arm according to the invention may include other features which can be taken separately or in combination, in particular:

- the spacing of its two walls may not be constant between their first and second end parts, such that the profile of the groove can vary. In this case, the spacing varies, e.g. substantially continuously, increasing from the first end parts to the second end parts, such that the profile of the groove can vary substantially continuously;
- the thickness of its two walls may not be constant between their first and second end parts. In this case, e.g. the thickness of the two walls is greater at their second end parts in order to increase their resistance;
- its two walls may each include a notch at the same selected level so as to define a housing which can receive a burner ring support. E.g. this burner ring support is positively connected to the two walls in the vicinity of their notches, possibly with the aid of rivets. The notches may moreover be formed in a zone of a part of the two walls intended to be placed in the passage for the secondary flow. This zone is then preferably placed in the vicinity of the first inner casing;
- each flange can be positively connected to the outer casing by means of at least one bolt, with the interposition of a backing plate on the side exposed to the secondary flow;
- the monobloc structure can be made of a composite material having a ceramic matrix.

The invention also relates to an afterburner device of the aforementioned type for a bypass turbojet, comprising at least three support arms of the type described hereinbefore according to one of the preceding features, positively connected to its outer casing.

A device of this kind may comprise, e.g. in its passage for the secondary flow an insulating liner defining together with the outer casing an afterburner jet pipe for part of the secondary flow. In this case, the burner ring support of each support arm is preferably installed at a level between the respective levels of the insulating liner and the first inner casing.

Other features and advantages of the invention will be clear from the detailed description hereinafter and from the accompanying drawings, in which:

FIG. 2A is a first perspective view of an embodiment of an arm according to the invention, before the fixing of a burner ring support;

FIG. 2B is a second perspective view of the arm of FIG. 2A;

FIG. 3 is a perspective view of an embodiment of an arm according to the invention, after the fixing of a burner ring support;

The accompanying drawings may serve not only to complete the invention, but also to help to define it, where appropriate.

Figure 1:
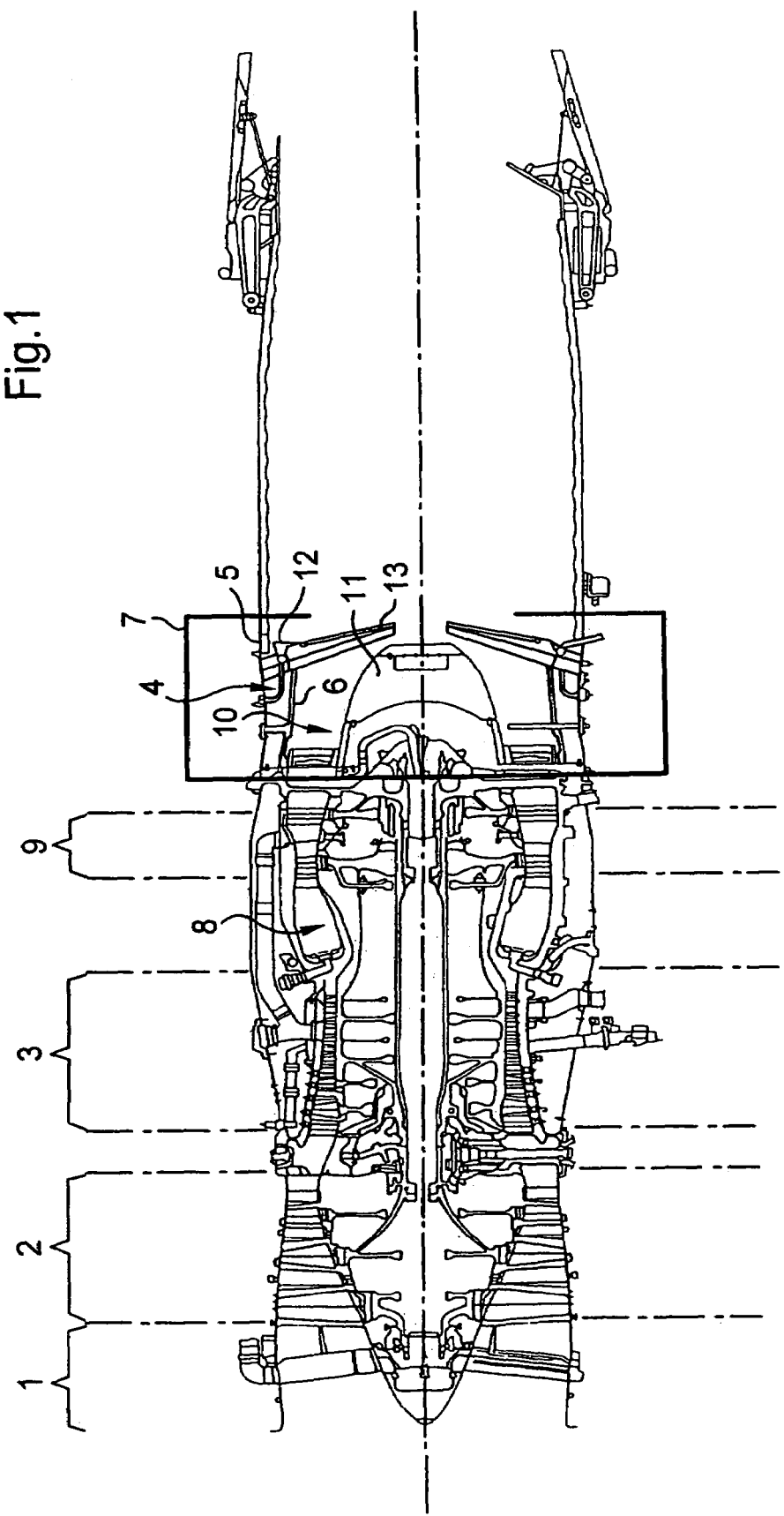
FIG. 1 is a diagrammatic longitudinal section of a bypass turbojet.

The invention relates to a support flameholder arm for an afterburner device of a turbojet engine of the type described in the introductory part with reference to FIG. 1.

A support arm 13 according to invention will now be described with reference firstly to FIGS. 1, 2A and 2B.

The support arm (or flameholder arm) 13 shown in FIGS. 2A and 2B is in the form of a monobloc structure made of a heat-resistant composite material. This composite material preferably has a ceramic matrix. E.g. the monobloc structure is made from a fibre preform, in particular of silicon carbide or carbon, into which a ceramic matrix in the liquid or gaseous phase is infiltrated. The monobloc structure can thus be made, e.g. with CERASEP® 410-12.

The use of a composite material is particularly advantageous as a result of the fact that it allows for a weight gain (compared to metal materials) and an increase in service life, particularly in the event of elevated operating temperatures.

The monobloc structure includes two substantially symmetrical walls 14 and 15 joined together on one longitudinal side so as to define a groove 16, the profile of which is substantially V-shaped in cross section.

These two walls 14 and 15 include first end parts 17 joined together and adapted to define a preferably bevelled foot 18 so as to promote the primary flow.

Each wall 14 and 15 moreover also includes a second end part 19 opposite the foot 18 and adapted to define at least one flange 20, 21 intended to be positively connected to the outer annular casing 5, as will be seen hereinafter with reference to FIG. 7. In order to allow for this positive connection, e.g. with the aid of bolts, each flange 20, 21 includes at least one through orifice 22, and preferably at least two, as shown in FIG. 2B.

In addition, each wall 14, 15 preferably includes a notch (or slot) 23 at a selected level (identical for both). These two notches 23 define a housing in which a burner ring support 24 can be placed, as shown in FIG. 3.

The level at which the notches 23 are formed is selected as a function of the intended location of the burner ring. In the example shown, they are provided in the vicinity of the second ends 19 so that the burner ring is placed in the duct 4 for the secondary flow. However, in a variant, they could be placed in a central part of the walls 14 and 15, or even in the vicinity of the foot 18 so that the burner ring is placed in the duct 10 for the primary flow.

E.g., as shown in FIG. 3, the burner ring support 24 includes a central part 25 defining a V-shaped groove open on two sides and extended substantially perpendicularly towards the rear by two lateral parts 26 positively connected to inner faces of the two walls 14 and 15 in the vicinity of their notches 23. This positive connection can be effected, e.g. with the aid of rivets 27.

The burner ring support 24 is made, e.g. of a metal material when it is situated in the "cold" secondary zone. However, it can also be made of a composite material, particularly when it is installed in the "hot" primary zone.

So as to allow for the positive connection of the burner ring to the burner ring support 24, the latter preferably includes at least one through orifice 28 on each of the two wings forming its central part 25.

Figure 4:
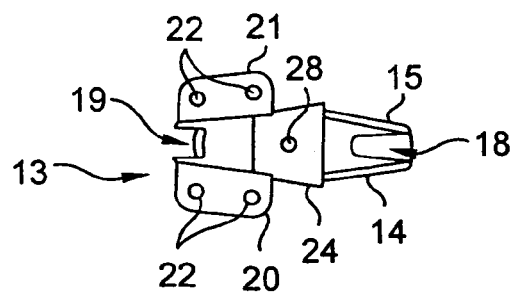
FIG. 4 is a top view of the arm of FIG. 3.
Figure 5:
FIG. 5 is a sectional view along the axis V—V of the arm of FIG. 3.
Figure 6:
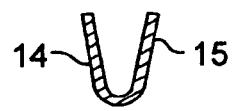
FIG. 6 is a sectional view along the axis VI—VI of the arm of FIG. 3.

As shown by the sectional views along the axes V—V and VI—VI of FIG. 3 shown in FIGS. 5 and 6 and by the top view shown in FIG. 4, the spacing between the two walls 14 and 15 may not be constant from the foot 18 to the second end parts 19. In other words, the V-shaped profile of the groove 16 can vary. More precisely, the spacing in this case increases substantially continuously from the foot 18 to the second end parts 19.

Although not shown in the figures, the thickness of the two walls 14 and 15 may moreover not be constant from the foot 18 to the second end parts 19, as it may be advantageous for part of the support arm 13 subjected to higher stresses than the other parts to be reinforced. Excessive thickness at the second end parts 19 therefore means that they will be more resistant to thermal stresses and to stresses due to airflow pressure.

An afterburner device 7 of a bypass turbojet includes at least three support arms 13 of the type described hereinbefore, and more preferably at least four. In some turbojet engines, the number of arms may be equal to nine (9).

An example of the positive connection of a support arm 13 to the outer annular casing 5 of an afterburner device 7 will now be described with reference to FIGS. 7, 8A and 8B.

As described hereinbefore, each support arm 13 is positively connected by means of its flanges 20, 21 to the outer annular casing 5.

As the positive connection is effected directly to the outer annular casing 5 in a "cold" environment (typically less than approximately 200° C.), there is no problem with a difference in thermal expansion between the support arm 13 and the outer annular casing 5. It is therefore possible to use particularly simple fixing (or positive connection) means, e.g. bolts 29. It is possible to use, e.g. two bolts 29 (and a minimum of one) in order to fix each flange 20, 21 in position.

Once positively connected, each arm extends substantially in a radial direction in relation to the axis of rotation of the turbine 9, also forming the axis of revolution of the outer 5 and inner 6 and 11 casings. It will be recalled that the expressions "inner casing 6" and "inner casing 11" as used here refer to what the person skilled in the art refers to respectively as the flow separator and the exhaust cone.

Figure 7:
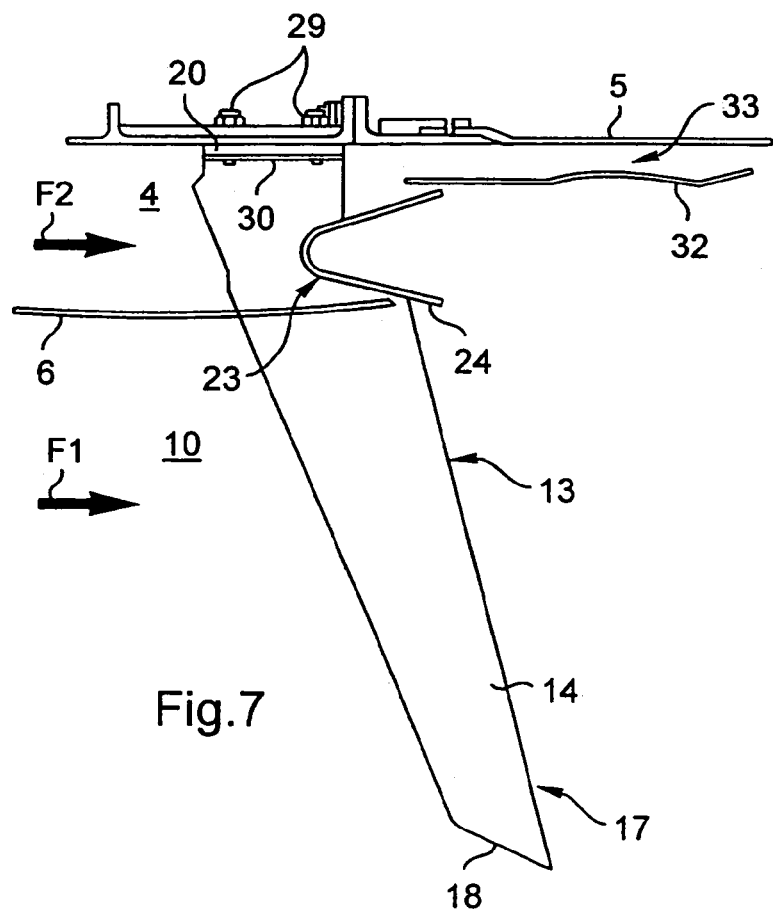
FIG. 7 is a side view of the arm of FIG. 3, after the positive connection to the outer casing of the afterburner device.
Figure 8A:
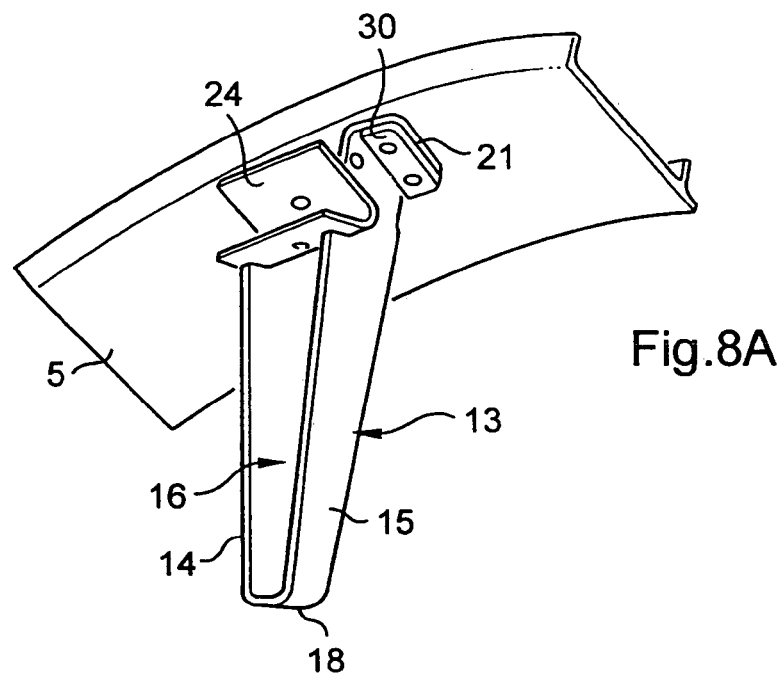
FIGS. 8A and 8B are two perspective views showing the assembly of FIG. 7 from two different angles.
Figure 8B:
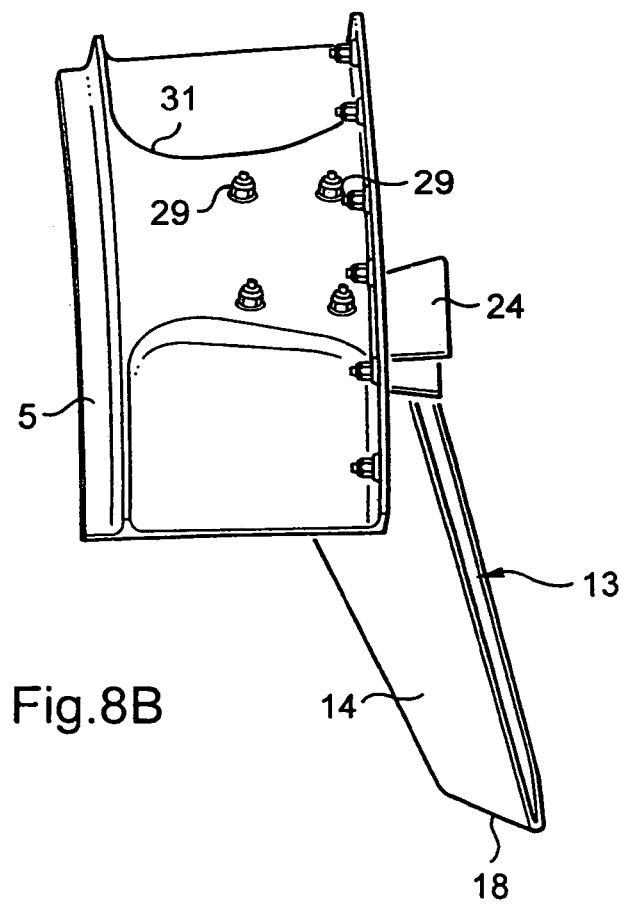

As shown in FIG. 7, the afterburner device 7 may include an insulating liner 32 interposed between the first inner annular casing 6 (or flow separator) and the outer annular casing 5 and defining together with the latter an afterburner jet pipe 33 in which at least part of the secondary flow circulates. This insulating liner 32 is generally a corrugated, multi-perforated plate intended to contain the afterburning gases (just like the walls of a principal chamber) and to protect the outer annular casing 5 from the hot flow. If an insulating liner 32 of this kind is present, the notches 23 in the walls 14 and 15 of each support arm 13 are formed at a level selected in such a manner that the burner ring support 24 is at least partially surrounded by the intermediate annular casing 32 and the first inner annular casing 6 (or flow separator).

As shown more clearly in FIG. 3, a reinforcing and/or protective backing plate 30 can moreover be placed under the outer face (opposite the outer casing 5) of each flange 20, 21 so that it is interposed between the latter and the nut or nuts. This makes it possible to increase the rigidity of the flanges 20 and 21 and to increase the resistance of the support arm 13 to mechanical stresses. This backing plate 30 is preferably made of metal.

It should be noted that the V-shaped profile and the shape of the foot 18 of each support arm 13 are selected so as to optimise the primary flow (arrow F1 in FIG. 7) and the secondary flow (arrow F2 in FIG. 7) and therefore to obtain aerodynamic behaviour corresponding to the expected performance.

A support arm 13 may moreover house an inner carburation device in its groove 16. As a result of the composite material used to produce the support arm 13, the latter can moreover withstand elevated temperatures, so that it is not necessary to provide it with an inner ventilation device intended to cool the component from its leading edge traversed by the primary flow.

The invention is not limited to the embodiments of the support arm and afterburner device described hereinbefore merely by way of example, but covers any variants which may be envisaged by the person skilled in the art within the scope of the claims hereinafter.

The invention claimed is:

1. A support arm for an afterburner device of a bypass turbojet, said device comprising first and second inner annular casings defining a passage for a primary flow and an outer annular casing defining together with said first inner annular casing a passage for a secondary flow, said support arm comprising:
    a monobloc structure made of composite material including two integral walls designed to define a groove having a substantially V-shaped profile and including first end parts joined together and adapted to define a foot and second end parts adapted each to define at least one flange which can be positively connected to the said outer casing,
    wherein the thickness of said walls is not constant between said first and second end parts.

2. The arm according to claim 1, wherein the spacing of said walls is not constant between said first and second end parts, such that the profile of said groove varies.

3. The arm according to claim 2, wherein said spacing varies substantially continuously, increasing from the first end parts to the second end parts, such that the profile of said groove varies substantially continuously.

4. The arm according to claim 1, wherein the thickness of said walls is greater at said second end parts.

5. The arm according to claim 1, wherein said walls each include a notch at the same selected level so as to define a housing which can receive a burner ring support.

6. The arm according to claim 5, wherein said burner ring support is positively connected to said walls in the vicinity of said notches.

7. The arm according to claim 5, wherein said burner ring support is positively connected to said walls with rivets.

8. The arm according to claim 5, wherein said notches are formed in a zone of a part of said walls intended to be placed in the passage for the secondary flow.

9. The arm according to claim 8, wherein said zone is intended to be placed in the vicinity of said first inner casing.

10. The arm according to claim 1, wherein each flange can be positively connected to said outer casing with at least one bolt, with the interposition of a backing plate on the side of the flange exposed to said secondary flow.

11. The arm according to claim 1, wherein said monobloc structure is made of a composite material having a ceramic matrix.

12. An afterburner device for a bypass turbojet, comprising:
    first and second inner annular casings defining a passage for a primary flow and an outer annular casing defining together with said first inner annular casing a passage for a secondary flow,
    at least three support arms, each according to claim 1 positively connected to said outer annular casing.

13. The device according to claim 12, further comprising, in the passage for said secondary flow, an insulating liner defining together with said outer annular casing an afterburner jet pipe for part of said secondary flow, and
    wherein said burner support ring of each support arm is placed at a level between the level of said insulating liner and the level of said first inner annular casing.

14. A turbojet comprising a support arm according to claim 1.

15. A turbojet comprising a support arm according to claim 2.

16. A turbojet comprising a support arm according to claim 3.

17. A turbojet comprising a support arm according to claim 4.

18. A turbojet comprising a support arm according to claim 5.

19. A turbojet comprising a support arm according to claim 6.

* * * * *